United States Patent
Diermeier et al.

(10) Patent No.: US 6,889,969 B2
(45) Date of Patent: May 10, 2005

(54) CUTTING BOARD WITH REMOVABLE FOOTINGS

(75) Inventors: Richard G. Diermeier, Waunakee, WI (US); Charles F. Smiley, Waunakee, WI (US); Carl R. Neess, Pardeville, WI (US)

(73) Assignee: Traex Company, Toledo, OH (US)

( * ) Notice: Subject to any disclaimer, the term of this patent is extended or adjusted under 35 U.S.C. 154(b) by 0 days.

(21) Appl. No.: 10/357,962

(22) Filed: Feb. 4, 2003

(65) Prior Publication Data

US 2004/0150151 A1 Aug. 5, 2004

(51) Int. Cl.$^7$ .............................................. B23Q 3/00
(52) U.S. Cl. ................................................ 269/289 R
(58) Field of Search ......................... 269/289 R, 302.1, 269/307, 285, 286; 298/188.8, 188.9

(56) References Cited

U.S. PATENT DOCUMENTS

| | | | |
|---|---|---|---|
| 1,702,144 A | | 2/1929 | Weston |
| 2,221,238 A | * | 11/1940 | Lloyd ....................... 248/205.5 |
| 2,849,201 A | * | 8/1958 | Schelgunov ............. 248/188.9 |
| 4,100,676 A | | 7/1978 | Ferguson |
| 4,116,426 A | * | 9/1978 | Kessler ....................... 269/307 |
| 4,840,361 A | | 6/1989 | Richter |
| 5,363,755 A | | 11/1994 | Liang |
| D372,176 S | | 7/1996 | Meisner |
| 5,626,067 A | | 5/1997 | Lothe |
| 5,860,641 A | | 1/1999 | Heath |
| D416,768 S | | 11/1999 | Lisser et al. |
| D424,891 S | | 5/2000 | Kaposi |
| D440,472 S | | 4/2001 | Paschal et al. |
| 6,409,138 B1 | * | 6/2002 | Baccini .................. 248/346.01 |

OTHER PUBLICATIONS

Web pages, *The Most Beautiful and Newest Board!*, Taiwan Cutting Board Co., LTD, www.cuttingboard.com.tw\ 1998/1999, two pages.

* cited by examiner

*Primary Examiner*—Robert C. Watson
(74) *Attorney, Agent, or Firm*—MacMillan, Sobanski & Todd, LLC

(57) ABSTRACT

A cutting board has an improved footing system that supports the cutting surfaces off the counter with removable footings inserted into openings at the corners of the board. The inserts have enlarged ends at each side of the board that elevate the board and prevent the inserts from separating from the board inadvertently. The foot inserts can be inserted straight into each preferably circular opening in which case one of the ends is compressed and passed through the opening for insertion or removal. Alternatively, the footings can also be slid into openings, formed as open-ended slots at the edge of the board, in which case the openings define a narrowed neck that interferes with a slightly wider section of the foot insert to reduce unintended separation. A grid pattern can be formed on either or both cutting surfaces using a suitable surface impression technique.

15 Claims, 3 Drawing Sheets

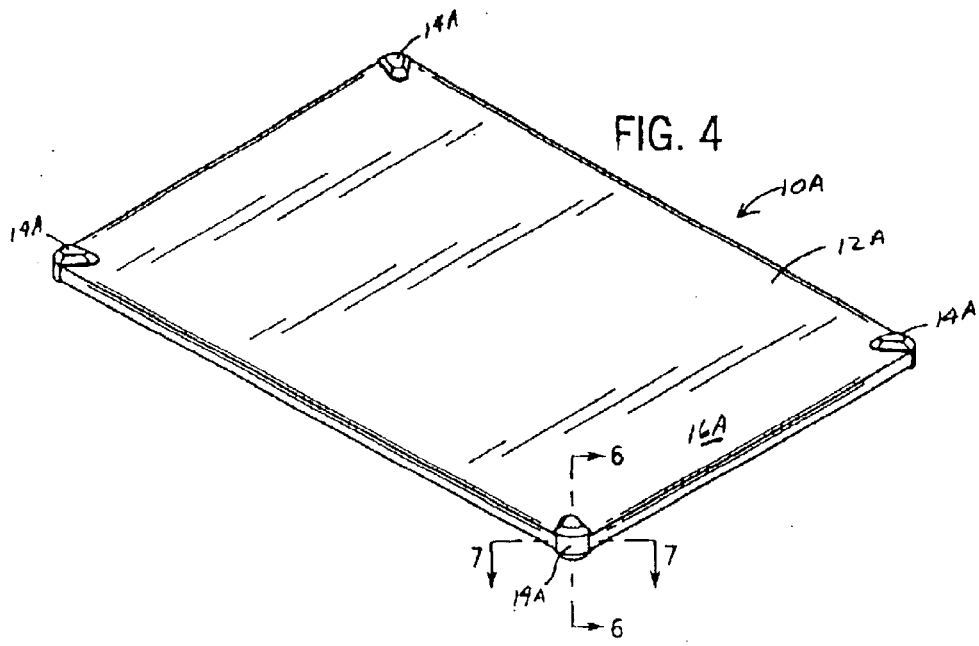
FIG. 4
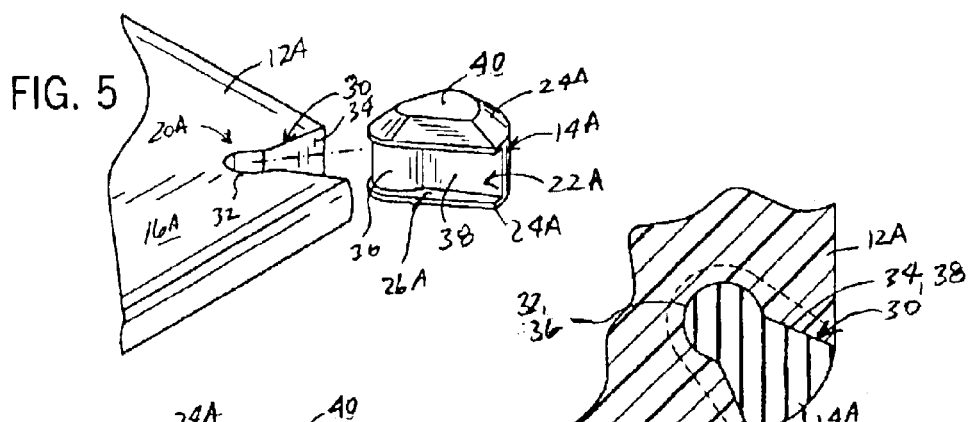
FIG. 5
FIG. 7
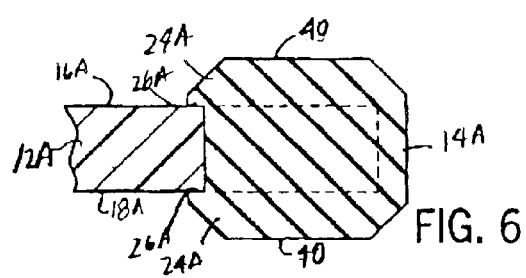
FIG. 6

CUTTING BOARD WITH REMOVABLE FOOTINGS

CROSS-REFERENCE TO RELATED APPLICATIONS

Not applicable.

STATEMENT OF FEDERALLY SPONSORED RESEARCH OR DEVELOPMENT

Not applicable.

FIELD OF THE INVENTION

This invention relates to cutting boards, and in particular to cutting boards with improved footing systems.

BACKGROUND OF THE INVENTION

Cutting boards are well known and come in many forms. Some are simple rectangular boards made of wood or plastic; others have handles or form various shapes. Some are made thick for chopping while others are made thin for slicing and dicing. Some include extendible wings that mount the board over a sink. In any case, however, all cutting boards have a flat cutting surface that can be used as a substitute for a counter top or other finished surface so that it is not cut or scraped when cooking.

Many cutting boards have two opposite cutting surfaces. Ordinarily the cutting surface being used faces up and the other cutting surface faces down. Each cutting surface can be used by flipping the board over. Conventional cutting boards have the non-used surface lay flat against the counter. However, this can introduce contaminants onto the lower cutting surface. For example, fluids from a piece of meat being trimmed could migrate to the counter and be picked up by the other cutting surface when it contacts the counter. This is undesirable for several reasons, for example, it can transfer bacteria to this surface, make it messy and change the color or flavor of another food item cut on this surface.

To overcome this problem, many cutting boards have footings on one or both of the cutting surfaces to elevate one or both of the surfaces from the counter. The footings can take any number of forms. For example, for one-sided cutting boards the footings can be wooden blocks (contoured for appearance) screwed into the bottom of the board at the corners. Or, the footings could be low-profile plastic disks adhered to the corners of the board on one or both cutting surfaces.

One problem with such conventional footed cutting boards is keeping the footings attached to the board. The adhesive can break-down and lose its grip when soaked or cleaned in a dishwasher causing one or more of the footings to fall off thereby leaving the board unstable. Another more significant problem for cutting boards with footings on the cutting surface is the build-up of food particles in the crevices around the footings that is difficult if not impossible to clean. This is not only unsightly and unappetizing, but it can also be unsanitary in that bacteria can reside in and spread from these areas.

U.S. Pat. No. Des. 416,768 shows a recent example of a plastic cutting board with two opposite cutting surfaces and raised feet that extend beyond the plane of the cutting surfaces so as to elevate these surfaces during use. The elastomeric feet slip over corners of the board that are recessed in from both sides and which taper inwardly in thickness and form grooves which receive raised ribs on the inner surface of the feet. A circular recess is also formed in each recessed surface of the corner of the board that receives a small projection molded on each inner side of the foot. The feet are molded of a flexible material (such as sanoprene) so that they flex outward to disengage from the board. However, if the feet are pinched against the board while trying to remove them, they are difficult to remove, since pinching them clamps the ribs and projections into the grooves and recesses.

This cutting board addresses many of the above mentioned problems with conventional boards. In particular, it provides a stable cutting board in which both cutting surfaces are spaced from the support surface by the raised corners. It also provides a tongue and groove type connection to help secure the corners to the board while allowing them to be removed for cleaning. However, this board still has disadvantages in that food material can easily get caught in the recessed grooves for securing the corners, thus requiring more frequent cleaning to avoid unsanitary conditions. Also, since the corners must flex outwardly to be removed from the board, they tend to widen and otherwise deform in a way that loosens the connection of the corners to the board, thus leaving them more susceptible to inadvertent disassembly.

Accordingly, a cutting board with an improved footing system is needed.

SUMMARY OF THE INVENTION

The present invention provides a cutting board with an improved footing system that supports both cutting surfaces of the board off the counter with removable foot inserts in opening in the board, preferably located at the corners of the board.

Specifically, the invention is a cutting board defining opposite planar cutting surfaces and at least two openings spaced apart and extending between the cutting surfaces. Easily removable footings fit into the openings and have opposite ends extending outwardly from the cutting surfaces so as to support the cutting surfaces away from a support surface on which the footings rest. Preferably, the footings each have a body and two enlarged heads with the body sized to fit within an opening and the heads being larger than the opening.

In one form, the openings are spaced from the periphery of the board so as not to intersect the edge of the board. The footings define an axial opening extending through the heads and the body defines a circumferential surface that fits snuggly within the openings, which are preferably circular in cross-section. The footings are elastically deformable such that at least the heads compress inwardly as they are pushed or pulled through the openings during insertion or removal.

In another form, the openings intersect the perimeter of the cutting surfaces such that the footings engage the openings from an open side at the periphery of the cutting board. In this case, the openings define a narrowed region for gripping an inward section of the footings sized larger than the mouth of the narrowed region. The openings define a circular portion located inward from the narrowed region and having a diameter larger than the narrowed region. The footings define a corresponding shape. The footings are elastically deformable so that the inward section deforms slightly as the footings are slid into and out of the openings.

In either, case, the footings each define a flat surface in the same plane as the others so that the cutting board can be set securely on a counter, table or other flat surface without teetering. The footings are not only deformable, but are preferably slip-resistant. A suitable rubber is preferred. Moreover, the footings are spaced apart at or near the periphery of the board, for example, at the corners of a rectilinear board.

In yet another form, one or both of the cutting surfaces can include a grid pattern. Preferably, the grid is formed by a surface impression technique without inking or cutting the cutting surfaces, for example, by embossing a flat surface or by forming the grid during the molding processes.

Thus, the invention provides a cutting board with an improved footing system. The footings are separate components of the board such that they can be removed (and reattached) as needed, for example, during cleaning. Enlarged ends of the footings securely retain the footings to the board until they are pulled free. The footings extend entirely through the board such that one foot can be used to elevate both sides of the board, thereby providing a solid base and reducing assembly steps.

The objects and advantages of the invention will appear from the following description. In this description reference is made to the accompanying drawings which form a part hereof and in which there is shown by way of illustration preferred embodiments of the invention. Such embodiments do not necessarily represent the full scope of the invention, however, and reference must be made therefore to the claims for interpreting the scope of the invention.

BRIEF DESCRIPTION OF THE DRAWINGS

FIG. 4 is a perspective view of another embodiment of the cutting board having a different configuration for the footings and corresponding open ended slots in the board;

FIG. 5 is an enlarged view of one corner of the cutting board of FIG. 4 showing a footing removed;

FIG. 6 is a cross-sectional view taken along line 6—6 of FIG. 4 showing the enlarged ends extending beyond cutting surfaces of the cutting board;

FIG. 7 is a cross-sectional view taken along line 7—7 of FIG. 4 showing the engagement of the body of the footing in the openings in the cutting board;

DETAILED DESCRIPTION OF THE PREFERRED EMBODIMENTS

Figure 1:
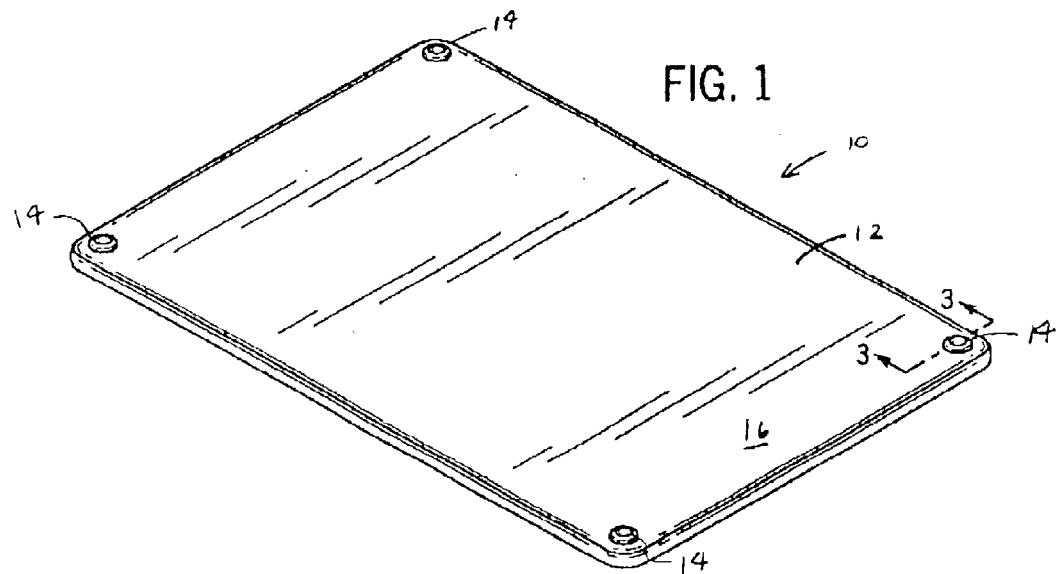
FIG. 1 is a perspective view of an embodiment of a cutting board according to the present invention.
Figure 2:
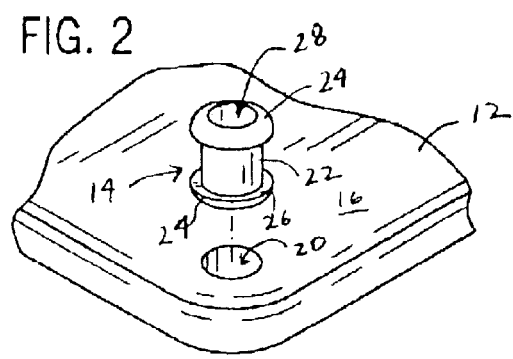
FIG. 2 is an enlarged view of one corner of the cutting board showing a footing removed.
Figure 3:
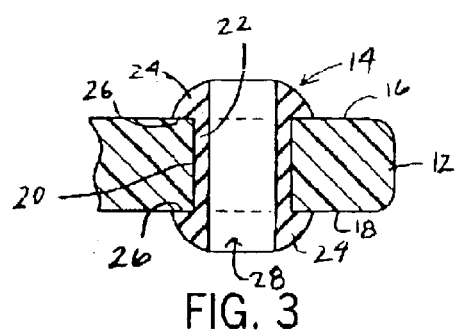
FIG. 3 is a cross-sectional view taken along line 3—3 of FIG. 1 showing the connection of the footing in an opening in the cutting board.

Referring to FIGS. 1–3, a preferred form of a cutting board 10 includes a flat board 12 and footings 14. The board 12 has opposite planar cutting surfaces 16 and 18 and a rounded edge at its perimeter. The board is shown as a thin flat rectangle, however, it can be any desired thickness and shape provided there is at least one surface suitable for cutting food items. The board has four holes 20 (one shown) spaced in from its corners that extend through both cutting surfaces.

The footings 14 are small grommet-like members. Each has a generally cylindrical body 22 with an outer circumferential surface sized to fit snuggly against the cylindrical surface defining the holes in the board. The length of the cylindrical body is approximately the thickness of the board. Each footing has enlarged ring-like heads 24 at each end of the body. The heads extend outwardly beyond each cutting surface and have an outer diameter larger than the holes in the board. The underside of each head defines a circular shoulder 26 extending at a right angle to the body for engaging the board and preventing the footing from passing through the hole inadvertently. Each footing has an axial through bore 28, which allows the footing to collapse radially inward when squeezed to aid in insertion and removal. The footings are preferably a suitable elastomeric material that is elastically deformable so as to retain their shape after being pulled through the holes.

The footings can be any color, as can the board. For example, the feet could be either black or white and all of the boards white, since it is easier to discern contamination on white boards. The color of the feet identifies the purpose of the board, e.g., meat or non-meat. Alternatively, the colors can be selected to have a particular color combination, for purely aesthetic reasons or to comport with the FDA HACCP (Hazard Analysis and Critical Control Point) food safety color coding system.

The configuration of the footings allows them to suspend the cutting surfaces off of a table or counter top regardless of which side is facing up. Moreover, the footings are preferably a flexible plastic or rubber so that they can be squeezed inward (permitted by the through bore), allowing one of the heads to fit into and through the hole. In this way, the footings can be removed from and reattached to the board as needed. One may wish to remove one or all of the footings to wash away food material caught between the board and the footings or to replace cut or torn footings. Removing all the footings allows the bottom of the board to lie flush against a counter or table if desired.

Thus, the footings extend entirely through the board such that each foot is used to elevate both sides of the board regardless of which-side is up. The rubber material of the footings provide a non-skid contact surface to keep the cutting board stable. The footings are securely attached to the board by virtue of the enlarged ends, but they can be removed by squeezing one end and pulling the footing through the hole from the opposite end. The footings extend past the cutting surfaces relatively far, at least ⅛ inch and preferably approximately ⅜ inch or more (especially for larger boards, which tend to flex more in use), such that the footings can accommodate some warping or flexing of the board without losing contact with the supporting surface or allowing the lower cutting surface to contact the supporting surface.

The construction of the cutting board also provides manufacturing and assembly efficiencies. First, assembly is made easier by the fact that only one footing is needed at a particular location to support both cutting surfaces off of the supporting surface (table or counter). Second, the holes can be formed in the board during molding (if the board is plastic) or the board can be extruded and the holes milled, which can be done without flipping the board since the opening extend through the board. This gives flexibility to the manufacturer, but more importantly, it allows a large extruded board to be manufactured and then cut down to a particular size, after which the holes can be milled into the board where appropriate for the size of the board. Thus, additional holes could be drilled, milled or molded at the center edges of the board for additional footing support between the corners. Also, if the board is extruded, the board can be but to any size without being limited to a particular mold size.

An alternate embodiment of the invention is shown in FIGS. 4–7. Elements like those described above will be referred to using similar reference numbers albeit with the suffix "A". In particular, like above, here the cutting board 10A includes a flat board 12A and footings 14A. The board 12A has opposite planar cutting surfaces 16A and 18A and a rounded edge at its perimeter. The board has four holes 20A (one shown) in the same locations as above, however, the corners are cut so the holes open at the edge of the board and define a chess pawn-shaped slot 30, with a circular head portion 32 and an angled body portion 34. The open side of the head portion extends circumferentially along an arc that is less than 180 degrees. The slots extend through both cutting surfaces like the holes above.

The footings 14A are larger than in the first embodiment and of a different configuration. Specifically, each footing has a middle body 22A with a head portion 36 and an angled body 38 tapering outward from the head portion. The body defines a pawn-like shape designed to fit snuggly into the slot. The head portion fits into (and is pulled out of) the corresponding portion of the slot only after deflecting inwardly slightly, thereby providing an interference fit tending to keep the footings in the slots and prevent inadvertent lateral separation from the board.

The length of the body is approximately the thickness of the board. The top and bottom heads 24A of the footings are larger than the body so as to define shoulders 26A that abut the cutting surface and act to resist longitudinal separation of the footing from the board. The heads extend outwardly beyond each cutting surface and have an outer diameter larger than the holes in the board. The heads each have a flat surface 40 so that the cutting board can be rest roughly parallel to the supporting table or counter. A footing is removed by simply pulling outward so that its head portion passes through the neck of the slot.

Figure 8:
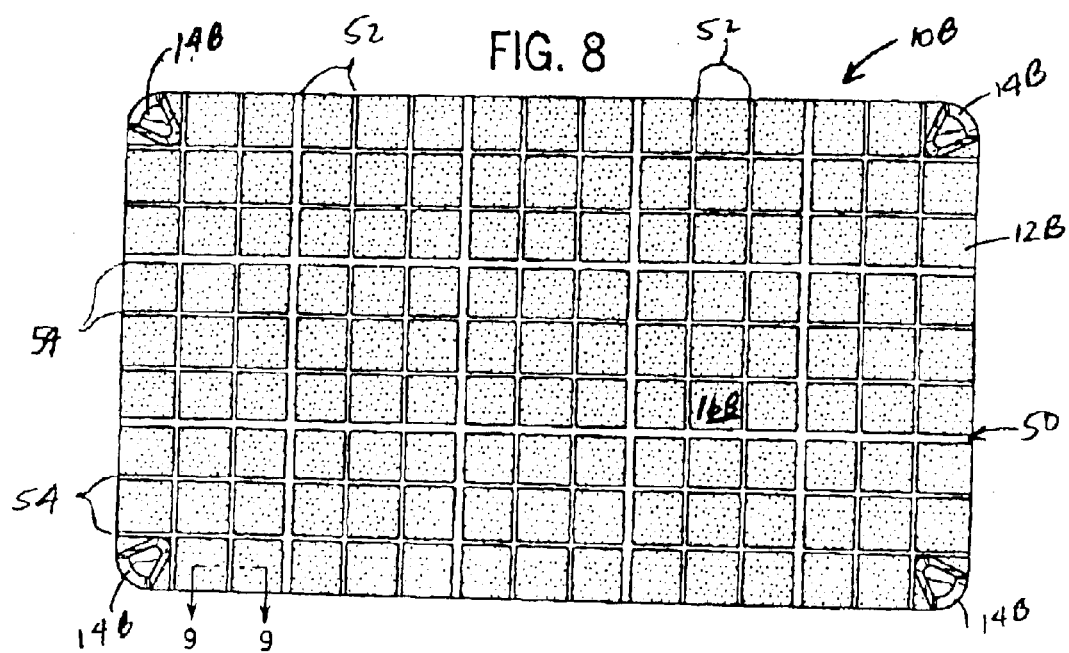
FIG. 8 is a top view of a variant of the cutting board of FIG. 4 having cutting surfaces defining a grid pattern.
Figure 9:
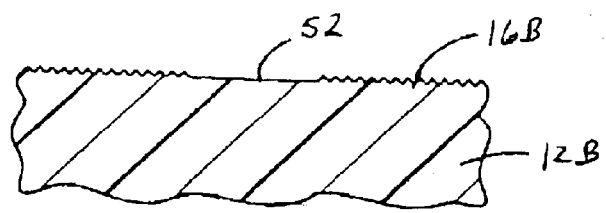
FIG. 9 is a partial cross-sectional view taken along line 9—9 of FIG. 8 showing the depression of a grid line in one of the cutting surfaces.

FIGS. 8 and 9 show another embodiment of the cutting board, the elements of which are referred to herein with the suffix "B" where appropriate. In this embodiment, the cutting board 10B is identical to the last described embodiment having a board 12B and a footings 14B with the same pawn-shaped configuration for the footings and slot. The difference here is that the cutting surfaces (only one shown 16B) are formed to define a grid pattern 50. The grid pattern 50 preferably is formed of a number of longitudinal lines 52 and lateral lines 54 defining 1" squares throughout the face of the cutting surfaces. The squares at the corners are not truly square due to the rounded corners of the board. Every third longitudinal 52 and lateral 54 line is of an increased width to further demarcate larger, 3" squares, again each of the corner squares have one rounded corner. The grid pattern aids in cutting consistent lengths and portions of food. The larger squares makes it easier to measure larger items.

The grid pattern can be formed in either one or both of the cutting surfaces using any suitable method, for example, by printing or cutting the longitudinal and lateral lines into the board. Printing is susceptible to being worn away and cutting the surface(s) leaves grooves in which food items can get trapped. Preferably, however, the grid pattern is formed into the cutting surfaces with only minimal surface depression so that the cutting surfaces are essentially flat and the grid pattern is essentially indelible. One preferred technique is to form the grid pattern with an injection molding process. The surface(s) could also be embossed using a die stamping technique.

The board may be either injection molded, with the openings for the footings formed in the molding process, or the board may be extruded from a suitable plastic and the openings for the footings cut in a secondary boring or milling operation. Extruding the board has the advantage of avoiding the relatively expensive tooling cost for a molded cutting board and the mold being limited to the particular size of the mold. When extruded, the board can be cut to any desired size. In addition it should be also claimed that the secondary operation of forming the opening in the cutting board is done without turning the board over. In addition, the foot openings should be bored or milled without having to turn the board over. This saves time and complexity in fabricating the slot for the foot. The footings are preferably a flexible plastic or rubber with enough resiliency to remain engaged in the foot openings during normal usage with an interference fit, but be easily removable from the foot openings for cleaning.

Illustrative embodiments of the invention have been described in detail for the purpose of disclosing practical, operative structures whereby the invention may be practiced advantageously. However, this is intended to be illustrative only, and the novel characteristics of the invention may be incorporated in other structural forms without departing from the scope of the invention. For example, the cutting board can be made of wood, metal, ceramic or any other suitable material. The board can be any suitable shape, such as square, circular, oval, paddle-shaped or in the form of an object, and it can have any number of footings located at the edges or anywhere in the board. Moreover, the board can be formed with other features, such as a handle or a gutter spaced in from its perimeter for collecting fluids.

Accordingly, to apprise the public of the full scope of the invention, the following claims are made.

What is claimed is:

1. A cutting board defining opposite planar cutting surfaces and at least two openings spaced apart and extending between the cutting surfaces in which are disposed removable footings having opposite ends extending outwardly from the cutting surfaces, the openings being open-ended slots intersecting the perimeter of the cutting surfaces such that the footings engage the openings from an open side at the periphery of the cutting surfaces, the footings each having a body and two enlarged heads, the bodies being sized to fit within the openings and the heads being larger than the openings, the footings extending entirely through the cutting board, the footings elevating the cutting board above a support surface engaged by the footings when either of the cutting surfaces is facing upwardly.

2. The cutting board of claim 1, wherein the bodies and the heads of the footings are elastically deformable.

3. The cutting board of claim 1, wherein the openings define a narrowed region for gripping an inward section of the footings sized larger than a mouth of the narrowed region.

4. The cutting board of claim 3, wherein at least the inward section of the footings is elastically deformable.

5. The cutting board of claim 3, wherein the openings define a circular portion located inward from the narrowed region and having a diameter larger than the narrowed region and wherein the footings define a corresponding shape.

6. The cutting board of claim 5, wherein the footings define flats for engaging the support surface.

7. The cutting board of claim 3, wherein the footings are slip-resistant.

8. The cutting board of claim 1, wherein the openings are spaced apart proximate to the periphery of the cutting surfaces.

9. The cutting board of claim 1, wherein the cutting surfaces define corners and wherein the openings are located proximate to the corners.

10. The cutting board of claim 1, wherein the cutting surfaces are substantially rectilinear defining four corners wherein each of the corners includes an opening and wherein there are four footings disposed in the openings.

11. The cutting board of claim 1, wherein the footings are of a color that indicates the intended use of the board.

12. The cutting board of claim 1, wherein the footings are of a prescribed color selected according to a standard food safety color coding scheme.

13. The cutting board of claim 1, wherein the footings extend from each of the cutting surfaces at least $\frac{1}{8}$ inch.

14. The cutting board of claim 13, wherein the footings extend from each of the cutting surfaces at least about $\frac{3}{8}$ inch.

15. The cutting board of claim 1, wherein the board is formed from an extrusion process and the openings are formed by a separate boring process.

* * * * *